June 2, 1959        F. C. KOCH        2,889,140
INDUSTRIAL WATER-COOLING TOWER CONSTRUCTION
Filed Nov. 1, 1955
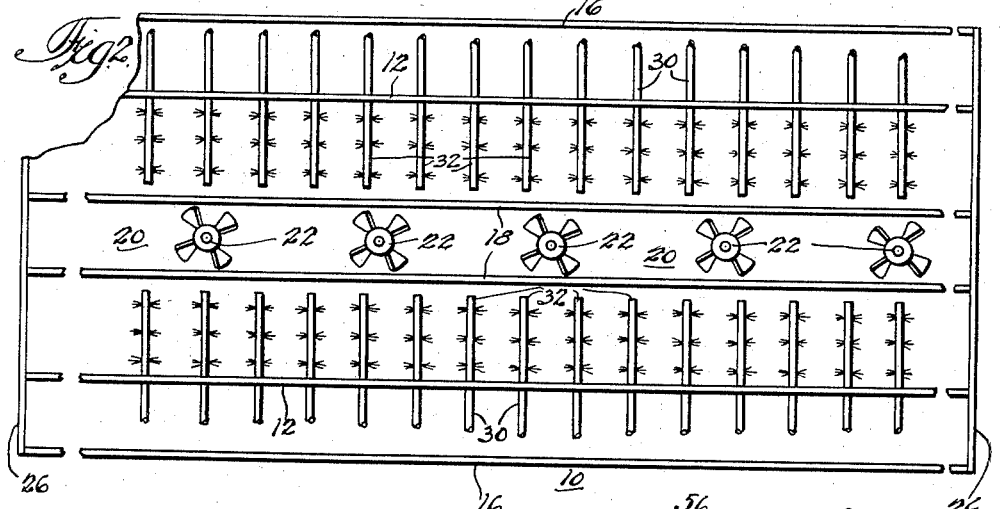
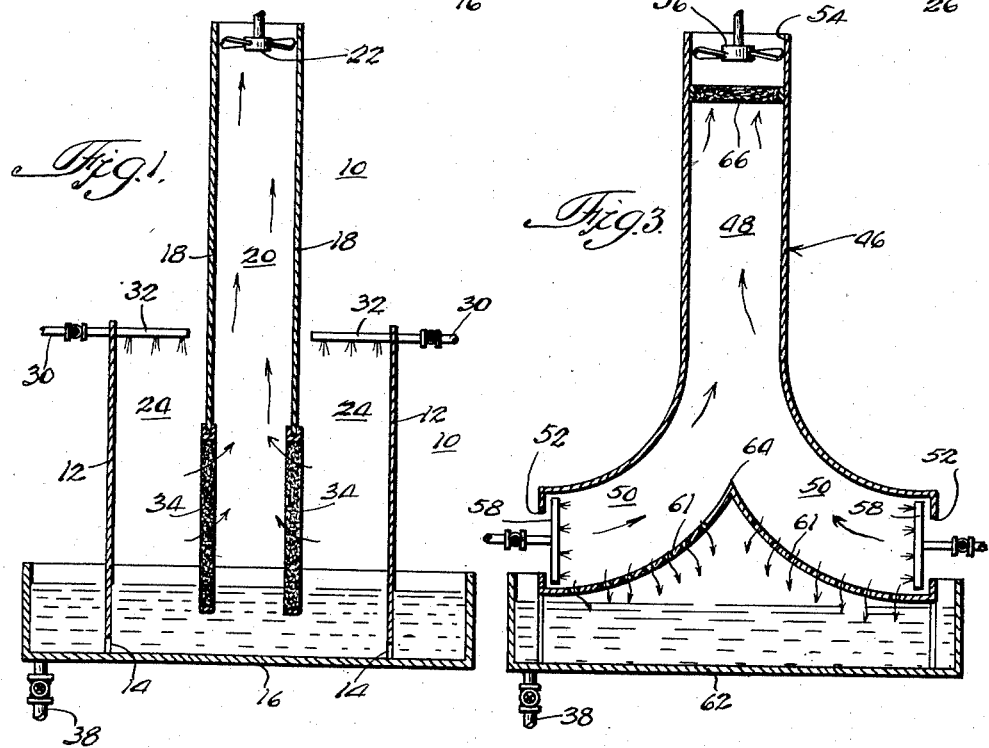
INVENTOR.
Fred C. Koch

2,889,140

INDUSTRIAL WATER-COOLING TOWER CONSTRUCTION

Fred C. Koch, Wichita, Kans., assignor to Koch Engineering Company, Inc., Wichita, Kans., a corporation of Kansas Application November 1, 1955, Serial No. 544,284

1 Claim. (Cl. 261—24)

The present invention relates to an improved water-cooling tower, and, more particularly, to a cooling tower for use in large scale industrial operations.

In substantially all industrial operations in which cooling water is used, it is more economical to cool and re-use the warmed water rather than discard it to waste. Cooling of the water is effected by contacting it with unsaturated air. When water comes in contact with air having a wet bulb temperature which is lower than the temperature of the air, the water is rapidly cooled by evaporation. If the unsaturated air is cooler than the water contacted, the water is also cooled by transfer of sensible heat to the air. To provide the largest water surface area possible for contact with the air, the warm water is finely subdivided by being sprayed through a nozzle into the cooling tower chamber.

In industrial water-cooling operations, either an atmospheric or a mechanical draft-cooling tower is generally employed. In the atmospheric tower, no mechanical means is utilized in circulating the air. In the mechanical draft type, a fan means is utilized in drawing or forcing air through the tower chamber for contacting the fine water spray and cooling the same. In the latter operation, it is desirable that the least possible resistance oppose the flow of air through the tower to maintain the pressure drop across the tower and the directly dependent power consumption of the fan or draft-inducing means at a minimum.

It is an object, therefore, of this invention to provide an induced draft tower which maintains the pressure drop of the circulating air at a bare minimum, assuring both efficiency and economy of operation.

It is also desirable in cooling tower operation that the loss of water by entrainment in the air discharging from the tower be maintained at a minimum.

Therefore, it is another object of this invention to provide a cooling tower which recovers substantially all of the sprayed water for reuse and maintains water losses at a minimum.

It is a still further object of this invention to provide a cooling tower construction which is composed of a minimum number of readily procurable parts and a construction which is relatively inexpensive in comparison with other cooling tower structures known in the art.

The above and other objects of this invention will become more apparent upon proceeding with the following description, accompanying drawing, and the appended claim.

In one embodiment of the cooling tower, a central open top enclosure or air passageway is provided having draft-inducing fan means disposed in the enclosure adjacent the open top tending to draw air from within the tower into the atmosphere. Side walls are disposed parallel to and spaced apart from the lower portion of the central enclosure walls defining the length thereof. Spray means are positioned in the interval between the side walls and the central enclosure, at the approximate level of the side wall top end limits. Water to be cooled is sprayed downwardly between the walls of the central enclosure and the side walls and collected in an underlying basin. The bottom portions of the central enclosure walls defining the length thereof comprise air permeable water-de-entraining sections so that, upon actuation of the fan means in the tower central enclosure, air is drawn in between the side walls and central enclosure, traverses the central enclosure de-entraining section and emerges through the open top of the central enclosure. Any spray entrained in the air is eliminated at the de-entraining section and collects in the underlying basin.

For a more complete understanding of this invention, reference should now be had to the drawing, wherein Figure 1 is a sectional view of a cooling tower constructed in accordance with the principles of this invention;

Fig. 2 is a top plan view of the cooling tower construction illustrated in Fig. 1; and Fig. 3 is a sectional view of a modified form of industrial cooling tower.

Referring now more particularly to Fig. 1, an industrial cooling tower 10 is illustrated which comprises oppositely disposed side walls 12 which are supported by leg members 14 at intermittent intervals along the wall length. The supporting members 14 are secured at their lower end limit to a basin member 16 which functions as a basin or reservoir collecting the cooled water which is to be reused in a particular industrial cooling operation. The tower side walls 12 are spaced apart from two centrally disposed enclosure walls 18. The latter enclosure walls define, in part, a tower passageway 20 which is in direct communication at its upper end limit with the atmosphere. Disposed adjacent the latter mentioned end limit and in the chamber 20 is a fan means 22 which is adapted to withdraw the air from within the chamber 20 and discharge the same into the atmosphere as indicated by the arrows in the drawing.

Communication is established between the main central passageway 20 and spray chambers 24 which are defined by the side walls 12 and the lower portion of the centrally disposed enclosure walls 18 by means of the air permeable and water-de-entraining sections 34 which comprise the lower end portions of the opposed central enclosure walls 18.

As will also be noted from Fig. 2, end walls 26 co-operate with side walls 12 and enclosure walls 18 in defining the spray chambers 24 and the main central chamber 20, respectively. The end walls 26 may also form the end walls for the basin 16. It is apparent, therefore, that the tower construction of Fig. 1 comprises a centrally disposed enclosure having disposed at each longitudinal side a spray chamber. The latter chambers are open at the top and in direct communication with the atmosphere.

The warm water which has been utilized in an industrial-cooling operation is fed into conduits 30 which communicate with the plurality of spray members 32 disposed across the upper opening of the two twin spray chambers 24, as illustrated. The warm water is sprayed downwardly into the chambers 24 and substantially all of the water immediately collects in the underlying reservoir 16. However, because of the fan means 22 disposed in the upper portion of the main enclosure 20, a draft is created which flows from the spray chamber atmospheric opening through air permeable sections 34 up the central chamber 20 and into the atmosphere. Since the water emerging through the sprays 32 is in a finely divided form, in order to present the largest surface area possible for contacting the incoming air and being cooled by the same, a portion of the spraying water will be entrained in the air current and tend to be carried along with the latter current which turns at an angle of approximately 90° in the course of traversing the air permeable section 34.

The latter sections, in addition to being air permeable, filter out any entrained water carried in the air current, The de-entraining sections 34 are preferably composed of fiber glass or other similar material, although wooden baffles or louvers common to the art will also work but less efficiently. Having passed through the de-entraining sections 34, the air current must once again turn 90° in the course of passing upwardly and out through the open upper end limit of the central main enclosure as defined by the two walls 18 and the end walls 26. It is obvious that substantially all of the water will be collected in the underlying basin 16 in the course of the spraying process and in the course of the air current movement from the spray chambers 24 into the centrally disposed main chamber 20.

As noted from Fig. 2, the cooling tower construction may extend to any length so as to handle any desired volume of water. Also, as the side walls 12 and the main enclosure walls 18 increase in length, an increasing number of fans 22 and sprays 32 are employed effecting efficient cooling despite the volume of the water to be cooled.

By inducing a draft to flow through the tower construction by means of fans 22 placed at the top of the tower, wet undesired air is blown away from the tower. However, if fans were placed at the bottom of the tower and air forced therethrough, recirculation of the humid exhaust vapors back into the air intake would occur. The velocity of the discharged humid air under forced draft is so low that fans disposed at the bottom of the tower would draw the humid vapors back into the tower, thereby greatly impairing the cooling efficiency.

The cool water collected in the basin is cycled by means of the valved line 38 to the place of use. It will be noted in Fig. 1 that the side walls 12 and the de-entraining sections 34 have their lower end limits disposed in the basin water so as to form a seal forcing the air current to proceed from the side wall opening, through the fiber glass de-entraining sections and then out the central enclosure opening. It will also be noted that the pressure drop present in the illustrated tower is extremely low. The fiber glass sections 34 may be extremely thin and yet effectively filter out the water contained in the air current while allowing the latter air to proceed up the main tower chamber 20. Both the spray chambers 24 and the central chamber 20 are devoid of the usual packing and wooden slats which are utilized as tower filling means. Consequently, there is no appreciable power consumption by the fan means since pressure drop of the air current through the tower construction is maintained at a bare minimum.

Fig. 3 refers to a modified cooling tower construction 46. In the latter construction, the main or centrally disposed tower chamber 48 is formed integral with two side spray chambers 50 which are in direct communication with the latter mentioned central chamber. The openings 52 to the side chambers are preferably disposed at an angle of 90° to the central tower chamber 48 so as to require a turn of 90° in the normal course of air flow from the side chamber inlets 52 into the central chamber 48 and thence out a central chamber open end limit 54. A fan means 56 is disposed in the central chamber 48 adjacent the open end limit 54. In the normal course of operation, the induced draft resulting from the fan means 56 draws air into the side chambers 50. Disposed across the side chamber openings 52 are spray members 58 which project inwardly and spray the water toward the central chamber 48. The inrushing air current induced by the fan means cools the spraying water with which it is intimately mixed as it carries the same into the central chamber. As the spray proceeds horizontally along the side chambers 50, heavy droplets of water fall to the perforated bottoms 61 of each side chamber. The droplets drain through the bottoms into an underlying basin 62. It will be noted that the bottoms 61 of the chambers 50 unite at a common point 64 which is preferably disposed at least as high as the uppermost portions of the side chamber inlets 52. Therefore, a greater quantity of water spray will be prevented from being entrained in the air current proceeding upwardly in the central chamber 48. Disposed in the upper portion of the chamber 48 adjacent the fan means and beneath the same is a water-de-entraining section 66 which filters out any fine mist which may remain in the air current at this point. Section 66, as are sections 34 in Fig. 1, is preferably composed of glass fibers.

Thus, it is apparent that in the second tower modification the air currents must alter their flow direction 90°, thereby assuring that the majority of the water will fall by gravity into the underlying basin 62. As in the tower construction illustrated in Figs. 1 and 2, a low pressure drop is assured since there is no obstructing means save for the the thin de-entraining section 66 in the tower interior. As in the tower modification illustrated in Fig. 1, the tower in Fig. 3 may extend longitudinally any desired length to comply with the volume of water sought to be cooled.

It is thus apparent that principles for the construction of cooling towers have been disclosed which assure a tower construction in which low pressure drop and resulting low power consumption is effected in the normal course of operation. In addition, the provided construction by reversing the path of the air current assures the elimination of entrained water in the air stream, and, in cooperation with the efficient de-entraining members, water losses are maintained at a minimum. The tower constructions illustrated are composed of inexpensive materials and may be efficiently run with a minimum of power consumption.

While two particular embodiments of this invention are shown above, it will be understood, of course, that the invention is not to be limited thereto, since many modifications may be made, and it is contemplated, therefore, by the appended claim, to cover any such modifications as fall within the true sprit and scope of this invention.

I claim:

In a cooling tower, the combination comprising a vertical enclosure having an upper end limit exposed to the atmosphere, at least one side enclosure disposed obtusely to said vertical enclosure and connected with the lower end limit of said vertical enclosure, the bottom portion of said side enclosure being perforated, said side enclosure being in communication with the atmosphere at the distal end limit thereof, spray means directed into said side enclosure from said distal end limit thereof, said spray means being directed at an angle of substantially 90° to said vertical enclosure longitudinal axis, draft-inducing means disposed in the upper end portion of said vertical enclosure whereby a flow of air is induced upwardly from said side enclosure distal end limit to said vertical enclosure upper end limit, the juncture between said side enclosure and said vertical enclosure being at a point which is at least as high as the uppermost portion of the side enclosure inlet whereby a minimum of water will be entrained in the air current proceeding upwardly into the vertical enclosure.

References Cited in the file of this patent

UNITED STATES PATENTS

| | | |
|---|---|---|
| Re. 21,794 | Mart | May 6, 1941 |
| 693,195 | Weightman | Feb. 11, 1902 |
| 1,966,280 | Bingman | July 10, 1934 |
| 2,022,740 | Rowell | Dec. 3, 1935 |
| 2,471,724 | Christensen | May 31, 1949 |
| 2,562,827 | Simpson | July 31, 1951 |

FOREIGN PATENTS

| | | |
|---|---|---|
| 1,071,680 | France | Mar. 10, 1954 |
| 718,487 | Great Britain | Nov. 17, 1954 |
| 631,512 | Germany | June 22, 1936 |